United States Patent Office 3,117,140
Patented Jan. 7, 1964

3,117,140
3-POSITION SUBSTITUTED ESTRANES
Erich Hecker, Munich, Germany, assignor to
Schering AG, Berlin, Germany
No Drawing. Filed July 24, 1961, Ser. No. 125,975
Claims priority, application Germany Nov. 5, 1959
17 Claims. (Cl. 260—397.1)

The present invention relates to 3-position substituted estranes, and more particularly to estratriene derivatives containing substituents in the 3-position which were hitherto unobtainable.

This application is a continuation-in-part of my copending application Serial No. 66,445, filed November 1, 1960, for "3-Position Substituted Estranes," now abandoned.

The estranes known prior to the present invention always carried in the 3-position an oxygen-containing substituent such as a hydroxy or any oxy group, or their functional variations, or perhaps also the sulfur analogs of these substituents. On the other hand, estrane derivatives carrying other substituents in the 3-position, were never developed prior to the present invention.

In my copending application Serial No. 22,412, filed April 15, 1960, for "Estrane Derivatives," I described a method of producing 3-amino compounds of the estrane series. As described therein, the 3-amino compounds are produced by reacting a quinole of the estrane series, e.g., a 3-oxy-$\Delta^{1,4}$-estradiene-19 hydroxy or acyloxy compound with a hydrazine derivative such as phenyl hydrazine to form the corresponding $\Delta^{1,3,5}$-estratriene-3-position azo dyestuff. The azo dyestuff may then be reductively split, for example by hydrogenation, to form the 3-amino compound.

It is accordingly a primary object of the present invention to provide for further 3-position derivatives of the estrane series.

It is yet another object of the present invention to provide for the production of other 3-position estrane derivatives starting from the 3-amino estrane compounds mentioned above.

Other objects and advantages of the present invention will be apparent from a further reading of the specification and of the appended claims.

With the above and other objects in view, the present invention mainly comprises a compound of the formula:

(I)
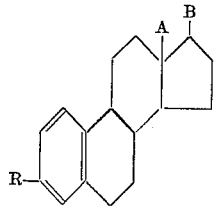

wherein A is selected from the group consisting of hydrogen and methyl, wherein B is selected from the group consisting of hydrogen, —OH, —Oacyl wherein acyl is derived from a lower aliphatic carboxylic acid, =O, and

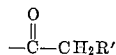

wherein R′ is selected from the group consisting of hydrogen, OH, Oalk wherein alk is a lower alkyl, and Oacyl wherein acyl is derived from a lower aliphatic carboxylic acid, and wherein R is selected from the group consisting of halogen, —CN, —SH, —COOH, —PO$_3$H$_2$, —AsO$_3$H$_2$, —CONH$_2$, —NO, —NO$_2$, $$-S-\overset{O}{\underset{\|}{C}}-O-C_2H_3$$

and (II)
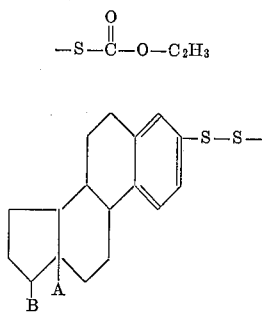

wherein A and B have the same definitions as above.

It has been found that the 3-amino estranes which are easily produced in accordance with the method described in my copending application Serial No. 22,412 can in simple manner be converted into new compounds containing various substituents in the 3-position, the variations of the substituents in the 3-position being practically unlimited and the resulting estrane derivatives having many important properties including that of being useful intermediates in the production of other steroids, for example by adding substituents in the 17-position or in other positions of the basic steroid molecule in known manner.

These 3-position compounds are produced in accordance with the present invention by diazotizing the aromatic amino group in the 3-position of the above named 3-amino estranes and then replacing the diazonium group of the thus obtained diazonium compound by methods analogous to the substitution thereof in other aromatic diazonium compounds by other substituents of the type R above, for example hydrogen, halogen, cyano, etc.

The starting 3-amino compound of the estrane series can carry further substituents in the ring system, particularly in the 17-position, such as saturated and unsaturated alkyl groups, etc.

Thus in general the method as the present invention mainly comprises the diazotizing of a compound of the following general formula:

(III)
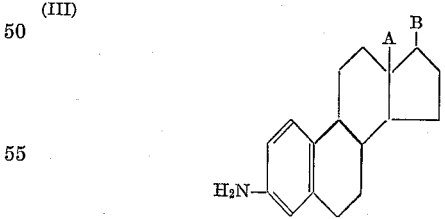

wherein A and B have the same definitions as above so as to convert the amino group to a diazonium group; and substitution of said diazonium group by the chosen substituent R in which case it is also possible to produce a compound wherein R is hydrogen.

The estrane derivatives of the present invention are of great use because of their interesting pharmacological properties and also because of the reactability of their substituents these compounds can serve as starting materials for the production of new steroids.

The compounds of the present invention have antiestrogenic or anticonceptive activity and can be used accordingly. Since the antiestrogenic action of these compounds in contrast to testosterone does not have virilizing side effects, these compounds may be used for purposes for which testosterone could not be used due to this virilizing side effect of testosterone.

The production of the estrane derivatives of the present invention may be illustrated by the following equations which show the conversion of 3-amino-17-acetate estratriene compounds into the 3-position estratriene derivatives of the present invention:

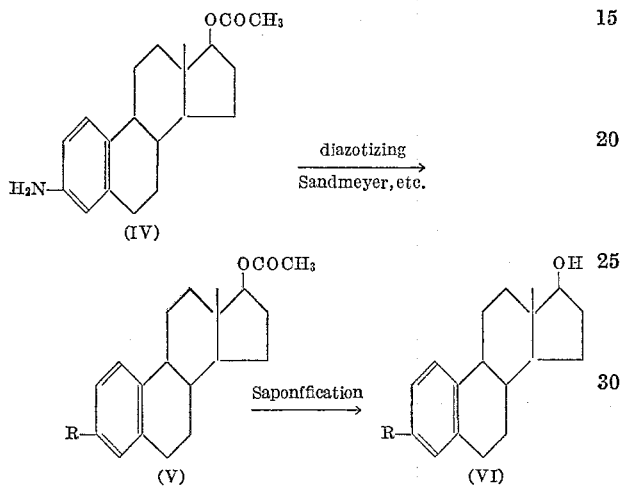

wherein R has the same definition as above, and more particularly in Example I is hydrogen, in Example II is chlorine, in Example III is iodine, in Example IV is cyano, in Example V is xanthogenyl and in Example VI is hydrogen.

The following examples are given to more fully illustrate the present invention. The scope of the invention is not, however, meant to be limited to the specific details of the examples.

EXAMPLE I

*The Production of $\Delta^{1,3,5(10)}$-Estratrienol-(17β)-Acetate*

0.5 millimol of 3-amino-$\Delta^{1,3,5(10)}$-estratrienol-(17β)-acetate are dissolved in 4 cc. of glacial acetic acid in the cold and reacted with 4 cc. of 5 normal hydrochloric acid. After cooling the solution to 0° C. a solution of 0.75 millimol of sodium nitrate in 1 cc. of water is added thereto dropwise during a time period of 20 minutes under vigorous stirring. After an additional 10 minutes a solution of 1 millimol of urea in 1 cc. of water is added thereto and stirred for an additional 10 minutes in the cold.

The thus obtained solution of the diazonium salt is reacted with 5 cc. of 60% hypophosphoric acid and after some stirring in the cold is stored for 20 hours at 0° C. It is then warmed for a short time on a water bath and thereafter worked up with methylene chloride, sodium bicarbonate and water. The dry residue of the working up upon chromatography on neutral aluminium oxide (activity IV) results in 107 mg. of $\Delta^{1,3,5(10)}$-estratrienol-(17β)-acetate, which after recrystallization from methanol melts at 120–121° C.

$[\alpha]_D^{250}$ +52° (2% in dioxane); $\lambda_{max}$ (260), 266, 273; $\epsilon_{max}$ (440), 547, 514 (in ethanol); IR (in KBr): $\nu$ (CO ester) 5.77; $\gamma$ (o-disubst. benzene) 13.41.

Calculated: C, 80.49; H, 8.78. Found: C, 80.31; H, 8.91.

Instead of glacial acetic acid as solvent facilitating agent for the diazotizing it is also possible to use with advantage tetrahydrofurane and instead of hydrochloric acid another acid may be used, particularly sulfuric acid.

EXAMPLE II

*The Production of 3-Chloro-$\Delta^{1,3,5(10)}$-Estratrienol-(17β)-Acetate*

The diazonium salt is produced as described in Example I above. The diazonium salt solution is in the cold under vigorous stirring added dropwise to a solution of 1 millimol of CuCl in 2 cc. of 2.5 normal hydrochloric acid. After 50 minutes the introduction is completed, stirring is continued for an additional hour and the working up proceeds as described in Example I above. After chromatography on neutral aluminum oxide (activation IV) 130 mg. of 3-chloro$\Delta^{1,3,5(10)}$-estratrienol-(17β)-acetate is obtained, which after recrystallization from methanol melts at 137° C.

$[\alpha]_D^{22°}$ +40° (2% in dioxane); $\lambda_{max}$ (265–6), 272, 280; $\epsilon_{max}$ (555), 794, 787 (in ethanol), IR (in KBr): $\nu$ (CO ester) 5.74.

Calculated: C, 72.16; H, 7.57; Cl, 10.66. Found: C, 71.92; H, 7.56; Cl, 10.16.

Saponification, for example with HCl as described in Example VII or with p-toluene sulfonic acid as described in Example VI, results in the formation of 3-chloro-$\Delta^{1,3,5(10)}$-estratrienol-(17β).

EXAMPLE III

*The Production of 3-Iodo-$\Delta^{1,3,5(10)}$-Estratrienol-(17β)-Acetate*

The diazonium salt is produced as described in Example I above. Into the diazonium salt solution at a temperature of approximately 10° C. a solution of 2 g. of potassium iodide in 2 cc. of water is added during a time period of 45 minutes under vigorous stirring. After 1 hour of stirring at room temperature the working up proceeds as described above. Chromatography on aluminum oxide, neutral, (activity IV) results in 149 mg. of 3-iodo-$\Delta^{1,3,5(10)}$-estratrienol-(17β)-acetate, which after recrystallization from methanol melts at 173° C.

$[\alpha]_D^{24°}$ +35° (2% in dioxane); $\lambda_{max}$ 230, 266; $\epsilon_{max}$ 14,800, 2,630 (in ethanol); IR (in KBr): $\nu$ (CO ester) 5.75.

Calculated: C, 56.61; H, 5.94; I, 29.91. Found: C, 56.55; H, 6.10; I, 30.40.

Saponification, for example with HCl as described in Example VII or with p-toluene sulfonic acid as described in Example VI, results in the formation of 3-iodo-$\Delta^{1,3,5(10)}$-estratrienol-(17β).

EXAMPLE IV

*The Production of 3-Cyano-$\Delta^{1,3,5(10)}$-Estratrienol-(17β)-Acetate*

The diazonium salt is produced as described in Example I above. The solution of the diazonium salt is added dropwise under vigorous stirring to a solution of 1 millimol of CuCN and 2 millimols of KCN in 2 cc. of water at room temperature. After 1 hour of stirring the working up is carried out as described above. Chromatography on neutral aluminum oxide (activation IV) results in 50 mg. of 3-cyano-$\Delta^{1,3,5(10)}$-estratrienol-(17β)-acetate, which after recrystallization from methanol melts at 181° C.

$[\alpha]_D^{21°}$ +49° (2% in dioxane); $\lambda_{max}$ 232, (270), 276, 286; $\epsilon_{max}$ 16,200, (1010), 1282, 1200 (in ethanol); IR (in KBr); $\nu$ (C=N) 4.48, (CO ester) 5.74.

Calculated: C, 77.98; H, 7.79; N, 4.33. Found: C, 77.66; H, 7.51; N, 4.44.

Controlled saponification of the type set forth in Example VI results in the formation of 3-cyano-$\Delta^{1,3,5(10)}$-estratrienol-(17β).

EXAMPLE V

*The Production of 3-Xanthogenyl-$\Delta^{1,3,5(10)}$-Estratrienol-17β-Acetate*

The diazonium salt is produced as described in Example I above. The neutral diazonium salt solution is added dropwise under vigorous stirring at 80° C. into a solution of 640 mg. of potassium xanthogenate in 6 cc. of water. The stirring is continued for an additional hour at 80° C. and the reaction mass is then further worked up as described above. Chromatography on neutral aluminum oxide (activation IV) results in 125 mg. of 3-xanthogenyl-$\Delta^{1,3,5(10)}$-estratrienol-17$\beta$-acetate as a yellowish oil, which after spraying with methanol crystallizes. After recrystallization from methanol colorless needle like crystals are obtained which melt at 125.5–127° C.

$[\alpha]_D^{22°}$ +45° (2% in dioxane); $\lambda_{max}$ (215), (240), 283; $\epsilon_{max}$ (22,500), (9,700), 11,000 (in ethanol); IR (in KBr): $\nu$ CO ester 5.75.

Controlled saponification of the type set forth in Example VI results in the formation of 3-xanthogenyl-$\Delta^{1,3,5(10)}$-estratrienol-(17$\beta$).

EXAMPLE VI

Saponification of the Acetate

This example is given to illustrate the saponification of the acetate, and the compound chosen therefor is the compound produced according to Example I.

135 mg. of $\Delta^{1,3,5(10)}$-estratrienol-(17$\beta$)-acetate are dissolved in 100 cc. of methanol and 135 mg. of p-toluene sulfonic acid added thereto. 80 cc. of methanol are distilled off during a time period of 5 hours, the residue is worked up with methylene chloride and bicarbonate and the dry residue is subjected to chromatography on neutral aluminum oxide (activation IV). There is thus obtained 78 mg. of $\Delta^{1,3,5(10)}$-estratrienol-(17$\beta$) which after recrystallization from a petroleum ether melts at 116° C.

$[\alpha]_D^{24°}$ +71° (in dioxane); $\lambda_{max}$ (212), (260), 266–273–4; $\epsilon_{max}$ (8480), (374), 481, 475 (in ethanol); IR (in KBr): $\nu$ (OH) 3.02, $\nu$ (o-disubstituted benzene) 13.28 13.58.

Calculated: C, 84.32; H, 9.44. Found: C, 84.60; H, 9.42.

EXAMPLE VII

The production of 3-carbomethoxy-$\Delta^{1,3,5(10)}$-estratrienol-(17$\beta$) of the formula:

(IX)

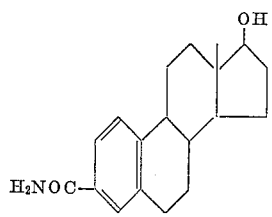

330 mg. of 3-cyano-$\Delta^{1,3,5(10)}$-estratrienol-(17$\beta$)-acetate of the following formula:

(VII)

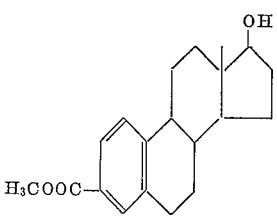

produced according to Example IV, are dissolved in 20 cc. of absolute methanol, brought to boiling on a water bath in a reflux condenser with a calcium chloride tube, and a vigorous stream of dry hydrogen chloride gas is passed into the boiling solution. After two hours the heat is removed and hydrogen chloride is continued to be passed into the solution until the reaction mixture reaches room temperature.

The reaction mixture is then poured into 100 cc. of ice water and worked up with water, sodium bicarbonate and ether. This results in the separation in the solvent system of an insoluble substance as an intermediate phase which is isolated by centrifugation.

215 mg. of a dry residue is obtained by evaporation of a clear ethereal solution. The dry residue is crystallized from methanol-carbon tetrachloride (1:1) and the resulting compound melts at 186–187° C.

$[\alpha]_D^{20}$ +75° (1% in dioxane).

$C_{20}H_{26}O_3$ (314.4). Calculated: C, 76.39; H, 8.34. Found: C, 75.16; H, 8.32.

$\lambda_{max}$ 244, 280, (288) m$\mu$; $\epsilon_{max}$ 15,500, 1,415, (1,183) (in ethanol); IR (in KBr): $\nu$ OH 2.85, $\nu$ CO ester 5.84 $\mu$.

EXAMPLE VIII

The production of 3-carbamoyl-$\Delta^{1,3,5(10)}$-estratrienol-(17$\beta$) of the following formula:

(VIII)

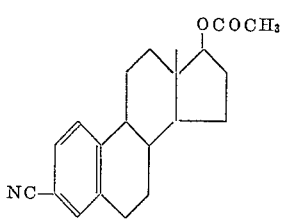

From the interphase mentioned above in Example VII 80 mg. of a substance is isolated which after chromatographic purification and recrystallization from methanol-water (5:1) melts at 186–187° C. The mixed melting point with the methylester (IX) lies at 161–165° C. Analysis and infra-red spectrum shows that the compound is 3-carbamoyl-$\Delta^{1,3,5(10)}$-estratrienol-(17$\beta$).

$C_{19}H_{25}O_2N$ (299.4)—Calculated: C, 76.22; H, 8.42. Found: C, 76.04; H, 8.44.

$\lambda_{max}$ 241, 277.5, (287) m$\mu$; $\epsilon_{max}$ 12,050, 1,030 (760) (in ethanol); IR (in KBr): $\nu$ OH, NH 2.94, 3.05, 3.13, $\nu$ CO amide I 6.01, $\nu$ CO amide II 6.40, $\nu$ C=C arom. 6.29 $\mu$.

EXAMPLE IX

The production of 3-carboxy-$\Delta^{1,3,5(10)}$-estratrienol-(17$\beta$) of the formula:

(X)

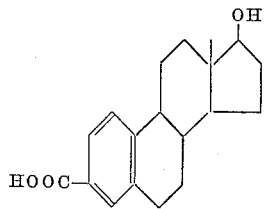

40 mg. of 3-carbamoyl-$\Delta^{1,3,5(10)}$-estratrienol-(17$\beta$)(IX) is reacted with 5 cc. of a 1 normal solution of potassium hydroxide in methanol/water (1:1) and after the addition of 5 cc. of methanol is heated for 1 hour under refluxing and under nitrogen. After cooling the pH of the solution is adjusted to a value of 2 with 1 normal sulfuric acid and then at room temperature the solution is concentrated to about one half the volume. After pouring into water it is worked up in the usual manner with ether. There is thus obtained 35 mg. of a dry residue which recrystallizes from methanol to give 19 mg. of compound (X) having a melting point of 287–289° C.

$[\alpha]^{25}$ +75° (1% in dioxane).

$C_{19}H_{24}O_3$ (300.4)—Calculated: C, 75.97; H, 8.05; O, 15.98. Found: C, 75.96; H, 8.15; O, 16.04.

$\lambda_{max}$ 242, 279, (287) m$\mu$; $\epsilon_{max}$ 15,200, 1,347, (1,100) (in ethanol); IR (in KBr): $\nu$ OH 2.89, $\nu$ CO carboxyl 5.95 $\mu$.

EXAMPLE X

The production of bis-[17β-hydroxyΔ$^{1,3,5(10)}$-estratrienyl-(3)]-disulfide of the following formula:

(XII)

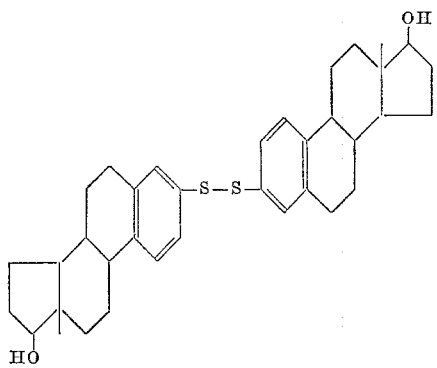

100 mg. of 3-xanthogenyl-Δ$^{1,3,5(10)}$-estratrienol-17β-acetate produced according to Example V, and having the following structure:

(XI)

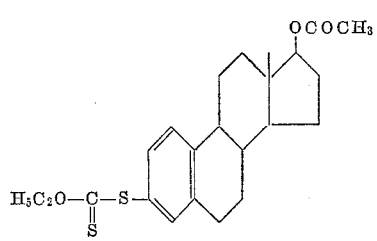

is warmed with 5 cc. of 4% ethanolic potassium hydroxide under nitrogen for 2 hours in a reflux condenser, and after cooling the sediment is neutralized with hydrogen chloride. The reaction mixture is mixed with a solution of 450 mg. of FeCl$_3$·6H$_2$O in ethanol. After 2 hours of stirring at room temperature the residue is poured into 50 cc. of water and cooled for several hours. This results in the separation of 70 mg. of a practically colorless substance which after chromatographic purification over aluminum oxide melts at 189–190° C.

C$_{36}$H$_{46}$O$_2$S$_2$ (574.9)—Calculated: C, 75.21; H, 8.07; S, 11.15. Found: C, 74.89; H, 8.00; S, 11.00.

λ$_{max}$ 235–40 mμ; ε$_{max}$ 21,550 (in ethanol); IR (in KBr): ν OH 2.90 μ.

EXAMPLE XI

*The Production of the Diacetate of Bis-[17β-Hydroxy-Δ$^{1,3,5(10)}$-Estratrienyl-(3)]-Disulfide*

30 mg. of the disulfide of Formula XII are reacted in normal manner with pyridine/acetanhydride. After working up there is obtained 25 mg. of a colorless substance which after recrystallization from a large amount of methanol melts at 226–228° C.

C$_{40}$H$_{50}$O$_4$S$_2$ (658.9)—Calculated: C, 72.90; H, 7.65; S, 9.73. Found: C, 73.05; H, 7.60; S, 9.85.

IR (in KBr): ν CO ester 5.75 μ.

EXAMPLE XII

*The Production of 3-Mercapto-Δ$^{1,3,5(10)}$-Estratrienol-(17β) of the Following Formula:*

(XIII)

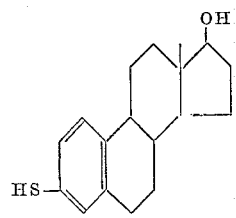

150 mg. of the disulfide of Example X (Formula XII) are dissolved in 33 cc. of glacial acetic acid and stirred with 50 mg. of zinc dust for 2 hours. The undissolved portion is filtered off, the residue is poured into water and extracted three times, each time with 20 cc. of methylene chloride. There is thus obtained 105 mg. of a dry residue which after recrystallization from benzene-petroleum ether (1:1) melts at 89–90° C.

[α]$_D^{21}$ +74° (1% in dioxane).

C$_{18}$H$_{24}$OS (288.4)—Calculated: C, 74.95; H, 8.39; S, 11.11. Found: C, 74.80; H, 8.45; S, 11.30.

IR (in KBr): ν OH 2.90, ν SH 3.89μ.

EXAMPLE XIII

*The Production of 3-Mercapto-Δ$^{1,3,5(10)}$-Estratrienol-17β-Acetate*

The diacetate of Example XI (Formula XII) is reductively split with zinc/glacial acetic acid as described above in Example XII. There is thus obtained as reaction product a colorless oil which after rubbing with methanol crystallizes and after recrystallization one time from methanol-water gives colorless needles melting at 105–106° C.

[α]$_D^{22}$ +77° (1% in dioxane).

C$_{20}$H$_{26}$O$_2$S (330.5)—Calculated: C, 72.68; H, 7.93; S, 9.70. Found: C, 72.77; H, 7.91; S, 9.50.

IR (in KBr): ν SH 3.89, ν CO ester 5.77μ.

The above examples illustrate the production of 17-hydroxy compounds and their 17-esters, e.g., 17-acetates, in accordance with the present invention. The corresponding 17-keto compounds can be produced in corresponding manner by diazotizing a compound of Formula III wherein B is a keto group, followed by substituting the resulting diazonium group in 3-position by the chosen substituent R.

This is illustrated by the conversion of 3-amino-Δ$^{1,3,5(10)}$-estratrienone-17 of the following formula:

(XIV)

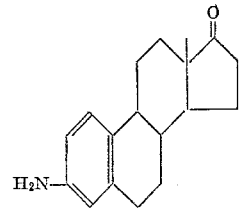

to estrone in accordance with the method of the present invention.

0.5 millimol of 3-amino-Δ$^{1,3,5(10)}$-estratrienone-17 is diazotized as described in Example I above. After the addition of urea the diazonium salt solution is brought to room temperature while continuing to stir, diluted with 6 cc. of water and warmed for 10 minutes at 80° C. The yellowish precipitate is filtered off under suction after cooling, and upon paper chromatography and, after sublimation at 2×10$^{-2}$ mm. Hg, is found to be identical with estrone by infra-red spectrum analysis as well as by melting point (249–251° C.) and mixed melting point (248–250° C.).

The following equations wherein, for brevity, the roman numerals corresponding to the particular structural formulas are used in place of the structural formulas themselves, illustrate the stages in the production of various derivatives in accordance with several of the above examples:

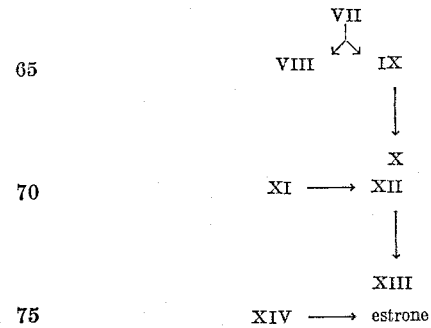

While the examples mention specifically the production of acetic acid esters in the 17-position, it is apparent that esters of other lower aliphatic carboxylic acids, such as propionic acid and butyric acid can be produced in like manner by substituting the corresponding 17-ester for the 17-acetates used as the starting material in the examples.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

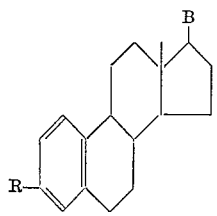

wherein B is selected from the group consisting of —OH, —Oacyl wherein acyl is derived from a lower aliphatic carboxylic acid, and =O; and wherein R is selected from the group consisting of halogen, —CN, —SH, —COOH, —COOCH₃, —CONH₂,

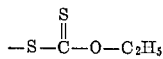

and

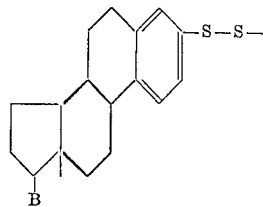

wherein B has the same definition as above.

2. 3-chloro-Δ¹,³,⁵⁽¹⁰⁾-estratriene-17β-ol-acetate.
3. 3-iodo-Δ¹,³,⁵⁽¹⁰⁾-estratriene-17β-ol-acetate.
4. 3-cyano-Δ¹,³,⁵⁽¹⁰⁾-estratriene-17β-ol-acetate.
5. 3-xanthogenyl-Δ¹,³,⁵⁽¹⁰⁾-estratriene-17β-ol-acetate.
6. 3-chloro-Δ¹,³,⁵⁽¹⁰⁾-estratriene-17β-ol.
7. 3-iodo-Δ¹,³,⁵⁽¹⁰⁾-estratriene-17β-ol.
8. 3-cyano-Δ-¹,³,⁵⁽¹⁰⁾-estratriene-17β-ol.
9. 3-xanthogenyl-Δ¹,³,⁵⁽¹⁰⁾-estratriene-17β-ol.
10. 3-carbomethoxy-Δ¹,³,⁵⁽¹⁰⁾-estratriene-17β-ol.
11. 3-carbamoyl-Δ¹,³,⁵⁽¹⁰⁾-estratriene-17β-ol.
12. 3-carboxy-Δ¹,³,⁵⁽¹⁰⁾-estratriene-17β-ol.
13. Bis - [17β - hydroxy - Δ¹,³,⁵⁽¹⁰⁾ - estratrienyl - (3)] - disulfide.
14. Bis - [17β - hydroxy - Δ¹,³,⁵⁽¹⁰⁾ - estratrienyl - (3)] - disulfide-diacetate.
15. 3-mercapto-Δ¹,³,⁵⁽¹⁰⁾-estratriene-17β-ol.
16. 3-mercapto-Δ¹,³,⁵⁽¹⁰⁾-estratriene-17β-ol-acetate.
17. In the method of producing a compound of the formula:

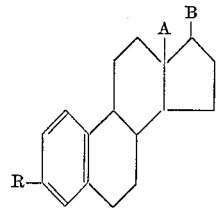

wherein A is selected from the group consisting of hydrogen and methyl, wherein B is selected from the group consisting of hydrogen, —OH, —Oacyl wherein acyl is derived from a lower aliphatic carboxylic acid, and =O, and wherein R is selected from the group consisting of hydrogen, halogen, —CN, —SH, —COOH, COOCH₃, —CONH₂,

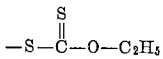

and

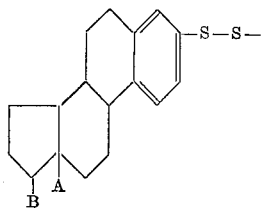

wherein A and B have the same definitions as above, the steps of diazotizing a compound of the formula:

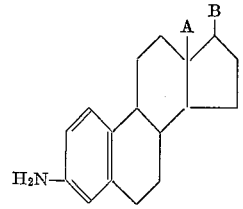

wherein A and B have the same definitions as above so as to convert the amino group to a diazonium group.

References Cited in the file of this patent
UNITED STATES PATENTS
2,947,763    Goldkamp _____ Dec. 17, 1958